(12) United States Patent
Miller et al.

(10) Patent No.: US 7,478,588 B2
(45) Date of Patent: Jan. 20, 2009

(54) BAKING APPARATUSES AND METHODS OF USE

(76) Inventors: Robert J. Miller, 895 Brookville Pkwy., Roswell, GA (US) 30075; Bruce Rosen, 4639 Sierra Ct., Duluth, GA (US) 30096

(*) Notice: Subject to any disclaimer, the term of this patent is extended or adjusted under 35 U.S.C. 154(b) by 1027 days.

(21) Appl. No.: 10/817,111

(22) Filed: Apr. 2, 2004

(65) Prior Publication Data

US 2005/0217498 A1 Oct. 6, 2005

(51) Int. Cl.
*A47J 43/18* (2006.01)
*A47J 43/20* (2006.01)

(52) U.S. Cl. .............. 99/426; 99/428; 99/432; 99/DIG. 15; 220/573.1; 220/506

(58) Field of Classification Search .............. 99/426, 99/428, 442, 432, DIG. 15; 220/573.1, 506, 220/912; 249/DIG. 1
See application file for complete search history.

(56) References Cited

U.S. PATENT DOCUMENTS

| | | | |
|---|---|---|---|
| 366,968 A | 7/1887 | McClave | |
| 434,688 A | 8/1890 | Veley | |
| 1,296,423 A | 3/1919 | Neef | |
| 1,334,930 A | 3/1920 | Chadwick | |
| 1,531,569 A | 3/1925 | Rade | |
| 1,567,234 A | 12/1925 | Brucker | |
| 2,028,671 A * | 1/1936 | Kollman | 220/506 |
| 2,030,344 A | 2/1936 | Young | |
| 2,454,054 A | 11/1948 | Gibb | |
| 2,529,354 A * | 11/1950 | Schroeder | 220/506 |
| 2,583,887 A * | 1/1952 | Schneeweiss | 126/385.1 |
| 2,607,338 A * | 8/1952 | Parenti | 126/385.1 |
| 3,473,489 A | 10/1969 | Sargent | |
| 3,741,427 A | 6/1973 | Doyle | |
| 3,946,893 A | 3/1976 | Bowersmith | |
| 4,395,015 A | 7/1983 | Reardon | |
| 4,644,858 A | 2/1987 | Liotto et al. | |
| 4,793,324 A | 12/1988 | Caferro | |
| 5,363,750 A | 11/1994 | Miller et al. | |
| 5,467,697 A | 11/1995 | Hunziker | |
| 5,537,917 A | 7/1996 | Schiffer et al. | |
| 5,676,050 A | 10/1997 | Beck | |
| 5,678,475 A | 10/1997 | Villar Otero | |
| 5,768,980 A | 6/1998 | Degen | |

* cited by examiner

*Primary Examiner*—Reginald L Alexander
(74) *Attorney, Agent, or Firm*—Alston & Bird LLP

(57) ABSTRACT

The present invention is directed to baking apparatuses that are adapted for use in baking cakes, custards and other dishes that involve the use of a water bath. In a disclosed embodiment of the invention a baking apparatus is disclosed that includes an inner and outer pan, which may be formed as an integral unit. The outer pan is preferably adapted to receive and hold water and the inner pan is adapted to receive a springform containing a cheesecake batter or other mixture. The side or sides of the inner pan are preferably watertight and prevent leakage of water into the inner pan. The present invention offers the advantage of water bath baking without the problem of water from the bath leaking into the springform that contains the cake batter.

7 Claims, 5 Drawing Sheets

BAKING APPARATUSES AND METHODS OF USE

BACKGROUND OF THE INVENTION

Water bath baking is a commonly-used process in the preparation of custards and cheesecakes. The water bath baking technique consists of placing a container (e.g., a pan, bowl or souffle dish) of food in a large, shallow pan of warm water. During the baking process, the water bath moderates the temperature around the perimeter of the pan, preventing overcooking at the edges. The water from the bath surrounds and protects delicate foods during the baking process and maintains an even, low-moisture heat. The water bath's even heat at a constant temperature allows even baking, and also prevents crust formation and rapid expansion, which can lead to cracking of surfaces. The technique is known in the art for use in the cooking of delicate dishes, including custards, flourless cakes, sauces and mousses.

Many flourless cake recipes call for using a springform and require the step of placing the springform into a water bath. A springform is a round, straight-sided pan with a removable bottom. In most springforms, the sides detach from the base by pulling a lever on the side of the pan. The detachable sides and bottom allow the removal of a cake from the pan without damaging the structure of the cake.

A problem associated with this baking technique is the leakage of water into the cake batter. Because the removable bottom of a springform is not water-tight, liquid from the water bath can leak into springform and cause the cake to be soggy or, depending on the amount of leakage, cause the cake to fall. A common solution to this problem is to line the outside of the springform with aluminum foil to separate the water bath from the cake batter. But as one or ordinary skill is well aware, a hole in the aluminum foil, even a pin-sized hole, can result in a soggy or fallen cake.

U.S. Pat. Nos. 4,644,858 to Liotto et al., U.S. Pat. No. 5,678,475 to Villar Otero, and U.S. Pat. No. 2,030,344 to Young disclose baking pan assemblies similar to the springform pans described above. These patents describe baking pans that have removable sides, which allow a fragile baking product, like a cheesecake, to be removed without damage to the structure of the cake. But these patents do not address the problem of baking a fragile cake in a water bath.

U.S. Pat. No. 3,946,893 to Bowersmith discloses a double pan utensil for baking cakes with water insulation held between the spaced apart side walls of the two pans. In the Bowersmith patent, an inner cake pan is disclosed as removably receivable in an outer pan whose side walls are spaced apart from the side walls of the inner pan. The spacing provides a water receiving space that surrounds the inner pan side walls for insulating these walls from the oven heat during the baking of the cake. But in the Bowersmith device, the cake batter is held in the inner pan and the device provides no means by which a fragile cake can be removed from the inner pan without damage to the structure of the cake.

A recognized need therefore exists in the art for an improved apparatus and method for baking a good in a water bath that allows the removal of a fragile baked good without damage to the structure of the baking product.

BRIEF SUMMARY OF THE INVENTION

The present invention is directed to baking apparatuses that are adapted for use in baking cakes, custards and other dishes that involve the use of a water bath. In one disclosed embodiment of the invention a baking apparatus is disclosed that includes an inner and outer pan, which may be formed as an integral unit. The outer pan is preferably adapted to receive and hold water and the inner pan is adapted to receive a springform containing a cheesecake batter or other mixture. The inner ring is preferably water-tight and the apparatus allows the cheesecake batter to be baked in a water bath without leakage of the water into the springform. In this way, the present invention offers the advantage of water bath baking without the problem of water from the bath leaking into the cake batter.

In accordance with one embodiment of the invention, a baking apparatus is disclosed that includes an outer pan having a first bottom and at least one side extending upward from the first bottom; and an inner pan having a second bottom and at least one side extending upward from the second bottom, the inner pan disposed entirely within the outer pan and the inner pan adapted to receive a springform pan. Additional embodiments are disclosed wherein the inner and outer pans concentrically aligned and wherein the pans have a substantially circular shape.

In accordance with another embodiment of the invention, a baking apparatus is disclosed that includes an outer pan having a first bottom and at least one side extending upward from the first bottom; and an inner pan having a second bottom and at least one side extending upward from the second bottom, the inner pan disposed entirely within the outer pan and adapted to receive a springform pan, and wherein the inner and outer pans cooperate to form a watertight area between the pans for use in holding water for a water bath.

In accordance with another embodiment of the invention, a baking apparatus is disclosed that includes an inner reservoir that is dimensioned to receive a springform pan, and an outer reservoir that extends adjacent the inner reservoir, the outer reservoir being substantially watertight.

In accordance with another embodiment of the invention, a baking apparatus is disclosed that includes an inner reservoir that is dimensioned to receive a springform pan, and an outer reservoir that extends adjacent the inner reservoir, the outer reservoir being substantially watertight, and wherein the outer reservoir defines a bottom, an inner barrier, and an outer barrier, the inner and outer barriers extends upward from the bottom, and wherein further the inner barrier, the outer barrier and the bottom cooperate to form a watertight pan that defines an interior portion and an upper opening; the pan being adapted to receive a liquid through the upper opening and to hold the liquid within the interior portion.

In accordance with another embodiment of the invention, a baking apparatus is disclosed in which the inner and outer pans are replaced by a single pan equipped with a watertight barrier that divides the pan into inner and outer portions, the outer portion being that area between the outside edge of the pan and the barrier, and the inner portion being that area defined by the areas inside the barrier, the outer portion being adapted to hold a liquid and the inner portion being adapted to receive a springform pan.

In accordance with another embodiment of the invention, a baking apparatus is disclosed that includes a bottom portion, an outer barrier extending upwardly from the bottom portion, the outer barrier defining an outer perimeter, an inner barrier extending upwardly from the bottom portion, the inner barrier being disposed within the outer perimeter, and the inner barrier cooperating with the outer barrier and the bottom portion to form a substantially watertight reservoir, the inner barrier defining an interior portion, a food item receiving member disposed within the interior portion, the food item receiving member being adapted for supporting a food item while the food item is baking; and the food item being substantially surrounded by the substantially watertight reservoir.

In accordance with another embodiment of the invention, methods of baking a cheesecake batter are disclosed that describe using the foregoing baking apparatuses, sometimes in combination with a springform pan, to bake a good in a water bath.

BRIEF DESCRIPTION OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

Figure 1A:
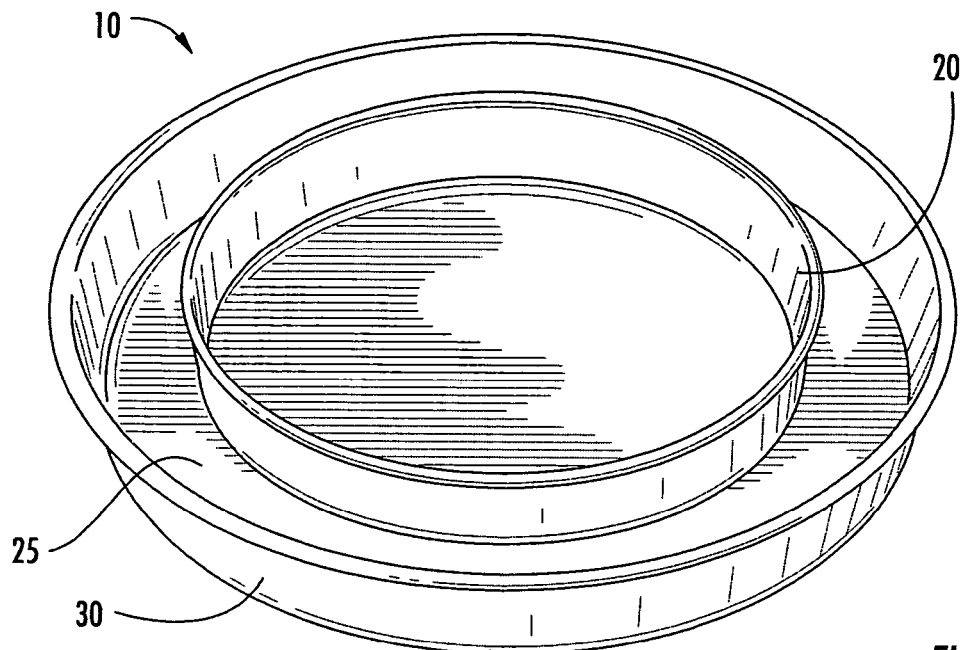
FIGS. 1A-1C show several views of a baking apparatus and a springform pan in accordance with a first embodiment of the present invention.
Figure 1B:
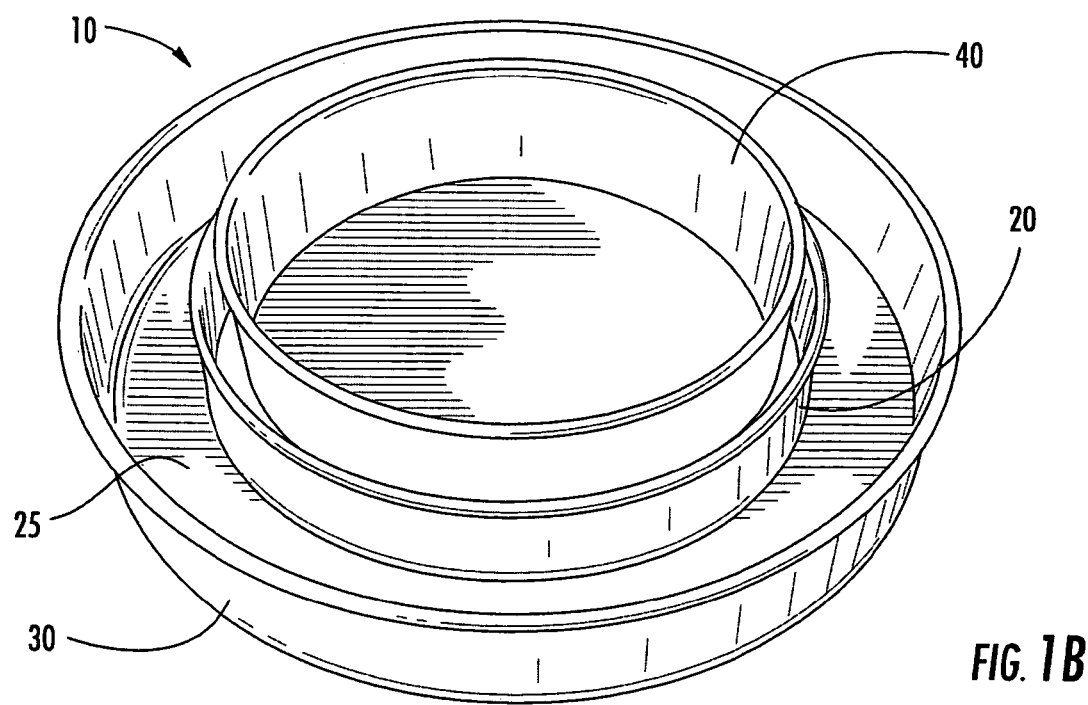
Figure 1C:
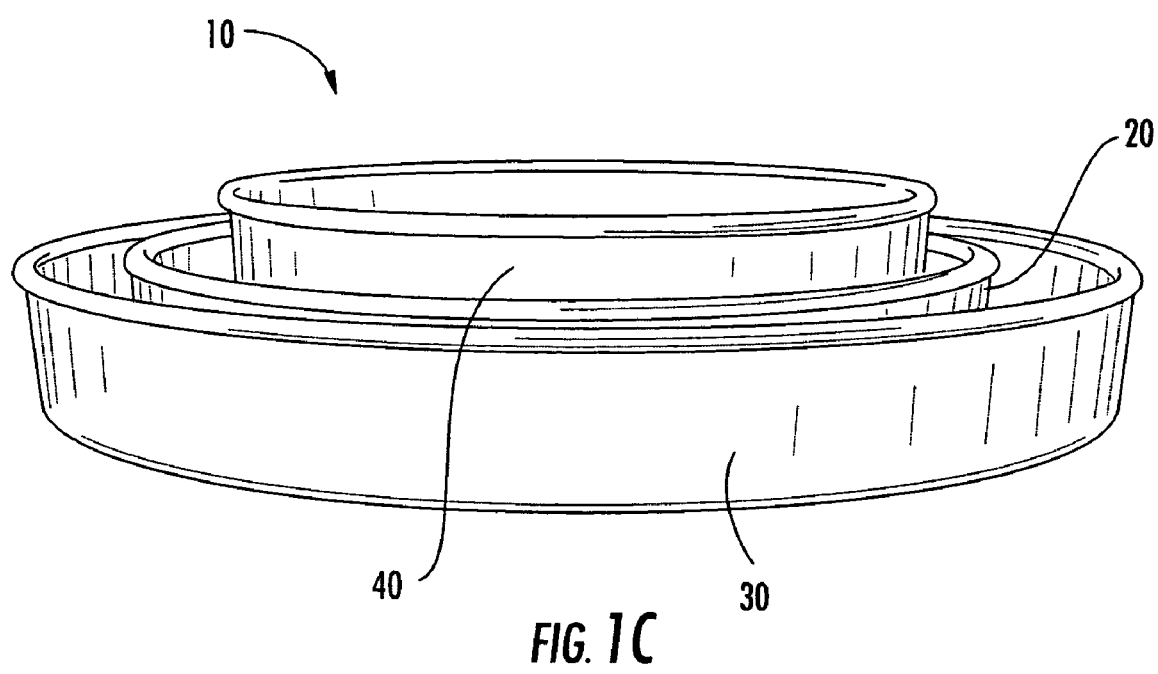

FIGS. 1A-1C show several views of a baking apparatus 10 in accordance with an embodiment of the present invention. FIG. 1A shows a perspective view of an apparatus 10 that includes an inner pan 20 disposed inside of an outer pan 30. A rim or moat area 25 is formed between the sides of the inner 20 and outer 30 pans. In a preferred embodiment, the sides of the inner and outer pans are of sufficient height to allow the moat area 25 to hold a liquid, such as the water of a water bath. The sides of the inner pan 20 are preferably watertight and prevent the liquid held in the moat area 25 from leaking inside the inner pan 20.

The inner pan 20 is preferably sized to receive a springform pan 40 (FIGS. 1B and 1C show the springform 40 disposed within the inner pan 20). As used herein, the terms springform and springform pan are used interchangeably. Springforms are well known in the art and are used for cakes and other baked goods that cannot be popped or lifted out of a mold. A common springform includes a bottom portion (typically made of glass or some form of metal) that is surrounded by a removable guard or sides. A buckle or other fastening device holds the guard tightly against the bottom portion and keeps the batter from leaking out during the. baking process. When the baking process is complete, the guard is released and lifted away from the baked good.

Springforms are available in a variety of shapes (e.g., circular, square, rectangular, heart-shaped) and sizes (e.g., 7, 8, 9, 9½ and 10 inches). In one embodiment, the inner pan 20 is sized and shaped to accept a predetermined size and shape of springform 40 such that the side or sides of the springform rest snugly against the side or sides of the inner pan 20.

In another embodiment, however, the springform pan does not rest against the inner pan 20 and a gap exists between the inner pan 20 and the edge of the springform 40. An advantage of this embodiment is that the inner pan 20 can be manufactured with a large enough diameter that it holds different shapes and sizes of springforms.

Figure 2A:
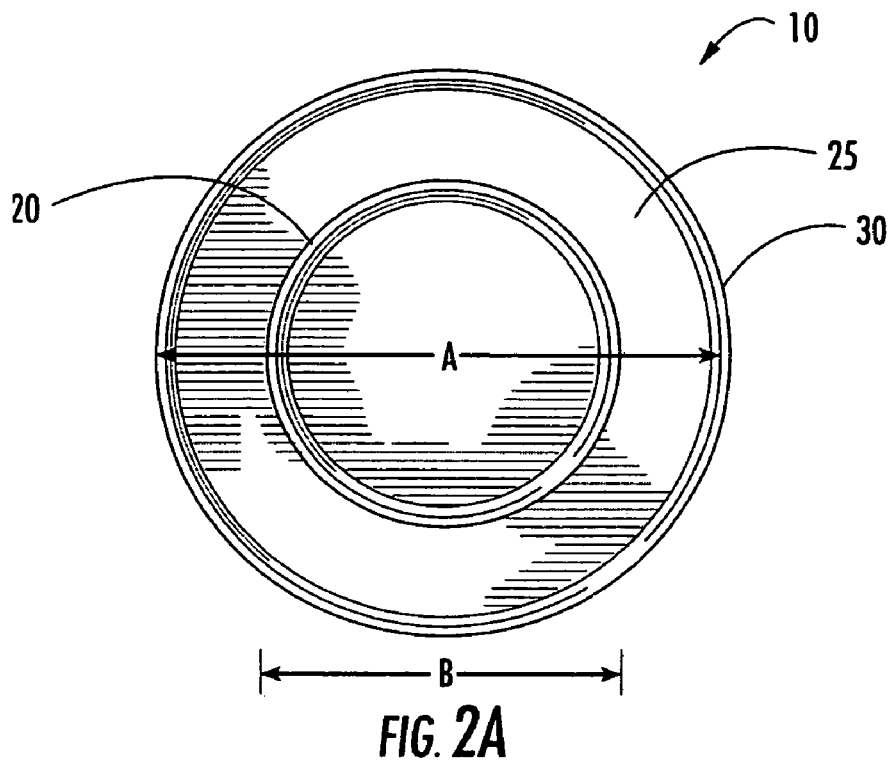
FIGS. 2A-2C show additional views of a baking apparatus and a springform pan and include exemplary dimensions for select portions of the baking apparatus and springform.
Figure 2B:
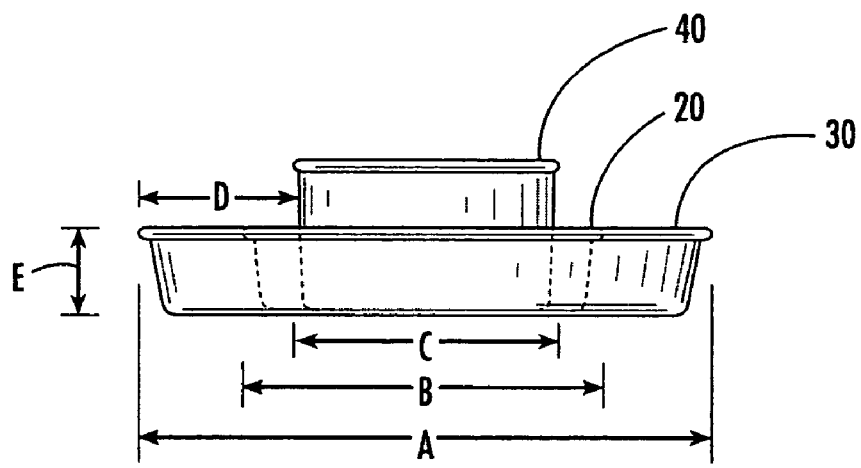
Figure 2C:
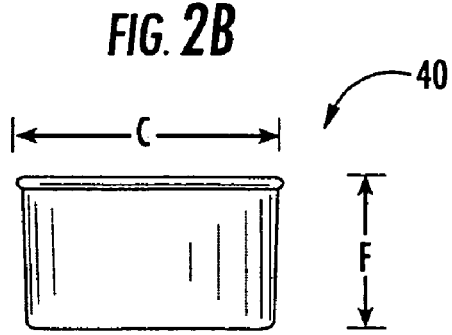

FIGS. 2A and 2B illustrate an embodiment of a baking apparatus 10. FIG. 2C illustrates the springform 40 apart from the apparatus 10. These figures illustrate an embodiment in which the inner and outer pans are circular in shape. Outer pan 30 is shown having diameter A and inner pan 20 having diameter B. In an embodiment, diameter A is about 14½ inches and diameter B about 10½ inches. The dimensions described herein are, of course, not intended to be limiting and are not essential to the operation of the baking apparatus 10, which can assume a variety of shapes and sizes. An advantage to having a circular inner pan 20 with a 10½ inch diameter B is that it is sized and shaped to receive the most common shape and sizes of springform pans 40, which typically are circular and range between six and ten inches.

FIG. 2B shows a side view of an apparatus 10 holding a springform 40. FIGS. 2B and 2C show a springform pan 40 having width C and height F and inner and outer pans with height E. In one embodiment, the springform pan 40 is circular in shape and has a ten inch width and a 2¾ inch height and the inner and outer pans have a height of 2¼ inches. Again, the actual dimensions will vary depending on the size and shape of the apparatus 10 and the springform pan 40 used with the apparatus 10, though it is should be noted that the springform 40 is sometimes easier to remove from the apparatus 10 when the springform height F is greater than the height of the inner and/or outer pans.

While the foregoing figures illustrate embodiments in which the inner and outer pans are circular, one of ordinary skill will recognize that the one or both of the pans can have a different shape and that the inner and outer pans may have different shapes.

In an alternative embodiment, the bottom of the outer pan 30 includes a clip, latch or other fastening device that allows different sizes and shapes of inner pans 20 to be attached to the outer pan 30. A latch or other fastening mechanism is disposed on the underside of the bottom of the inner pan 20 and a corresponding portion of the fastening device is disposed on the topside of the bottom of the outer pan 30. This arrangement allows the inner pan 20 to be selectively attached and detached from the outer pan 30 and thus a plurality of inner pans 20 of different sizes and shapes may be used with a single outer pan 30.

In one embodiment of the present invention, the inner pan 20 has its own bottom that sits atop the bottom of the outer pan 30. The two pans are preferably attached to keep the inner pan 20 from moving during the preparation and baking processes. Alternatively, the inner and outer pans are not attached but are actually two portions of a single contiguous piece of metal (or other suitable material) from which the baking apparatus is manufactured.

The inner and outer pans are preferably aligned concentrically, but such an arrangement is not essential to the use of the apparatus.

An alternative embodiment of the present invention is an arrangement in which the inner and outer pans are replaced by a single pan equipped with a barrier that divides the pan reservoir into inner and outer portions. In this embodiment, the outer portion of the pan, that is, the area between the outside edge of the pan and the barrier holds the water of the water bath in much the same way as the moat area 25 described above. The barrier that separates the inner and outer portions of the pan is preferably watertight and keeps the water from leaking into the inner portion of the pan.

Another aspect of the invention is a baking apparatus that includes an inner reservoir and an outer reservoir. The outer reservoir preferably extends adjacent the inner reservoir and a watertight barrier is disposed between the inner and outer reservoirs. In one embodiment, the outer reservoir defines a bottom, an inner barrier and an outer barrier. The two barriers extend upward from the bottom and cooperate to form a watertight pan that defines an interior and an upper opening. The pan is preferably adapted to receive a liquid through the upper opening and holds the liquid within the interior portion. In a preferred embodiment, the outer barrier extends the length of the outer perimeter of the bottom, and the inner barrier is disposed entirely within the outer perimeter.

Another aspect of the present invention is a method of preparing a cheesecake or other baked good using one of the baking apparatuses described above. The ingredients used to create a cheesecake batter are well known in the art and the varieties of available recipes are outside the scope of this document.

The process begins when a cake batter is transferred to a springform pan 40. The springform pan 40 is then placed inside the inner pan 20 (or reservoir) of the baking apparatus 10. The inner pan 20 is preferable adapted to receive the size and shape of the particular springform pan 40 being used so that the springform 40 fits snugly against the inner pan 20 (or barrier) of the baking apparatus 10. A clip or other fastening feature may alternatively be used to hold the springform 40 against the inner pan 20 or inner barrier.

In another step of the process, water or another suitable liquid is added to the outer pan 30 (or reservoir or moat area 25) of the baking apparatus 10. The step of adding water to the moat area 25 can occur before or after the step of placing the springform pan 40 into the baking apparatus 10.

The next steps of the process are to place the baking apparatus 10, including the springform 40, into an oven and to bake the batter until the cheesecake (or other baked good) is done. The baking apparatus 10 is then removed from the oven, the springform 40 is removed from the apparatus 10, the guard (or sides) of the springform pan 40 is released and the cake is removed from the springform pan. In this way, the present invention offers all of the advantages of baking in a water bath without the problem of leakage from the water bath into the springform and into the batter of the baked good. And because the cheesecake (or other baking product) is held in a springform pan, the cake can be removed from the pan without damage to the cake structure.

Figure 3A:
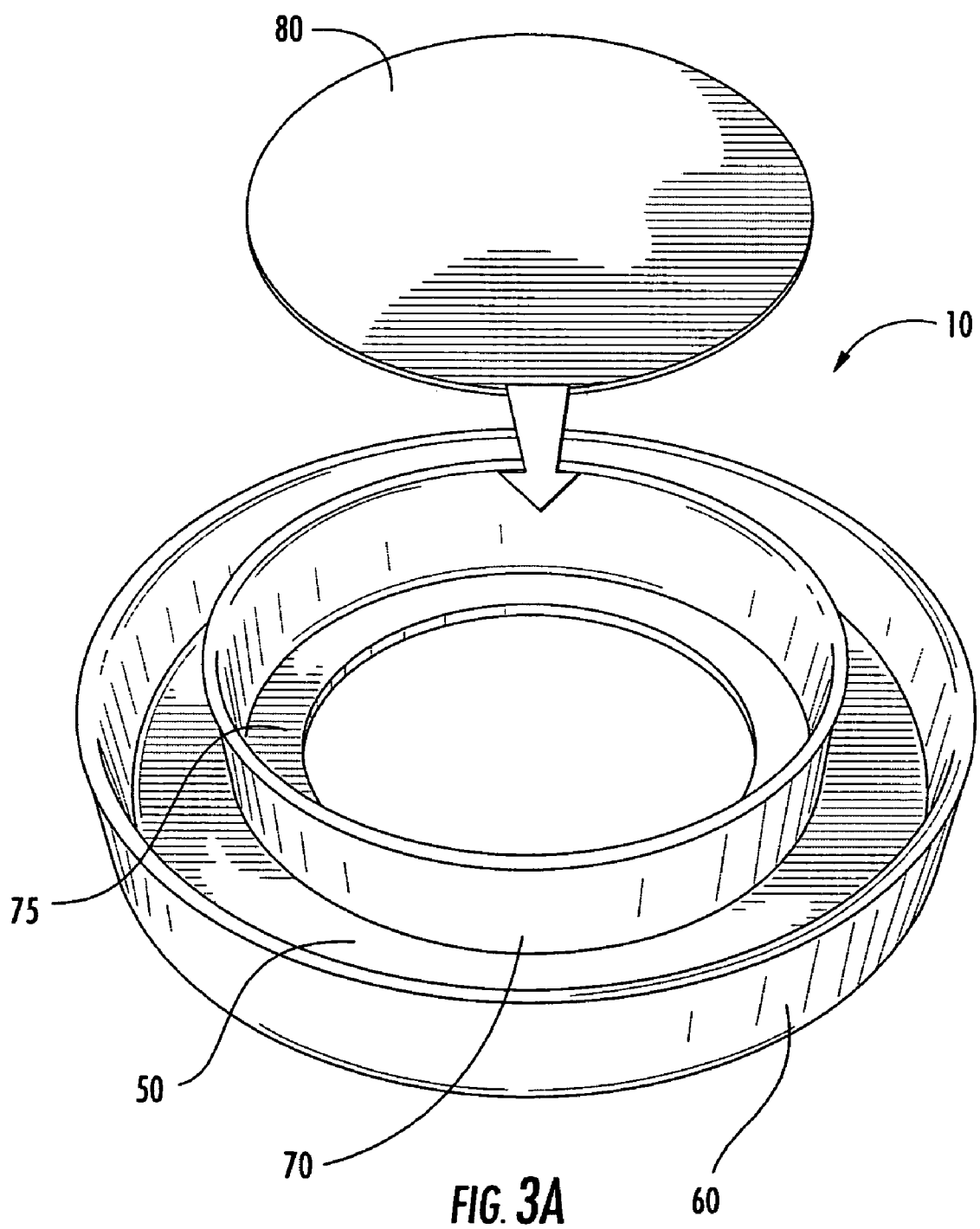
FIGS. 3A-3C show several views of a baking apparatus in accordance with another embodiment of the present invention.
Figure 3B:
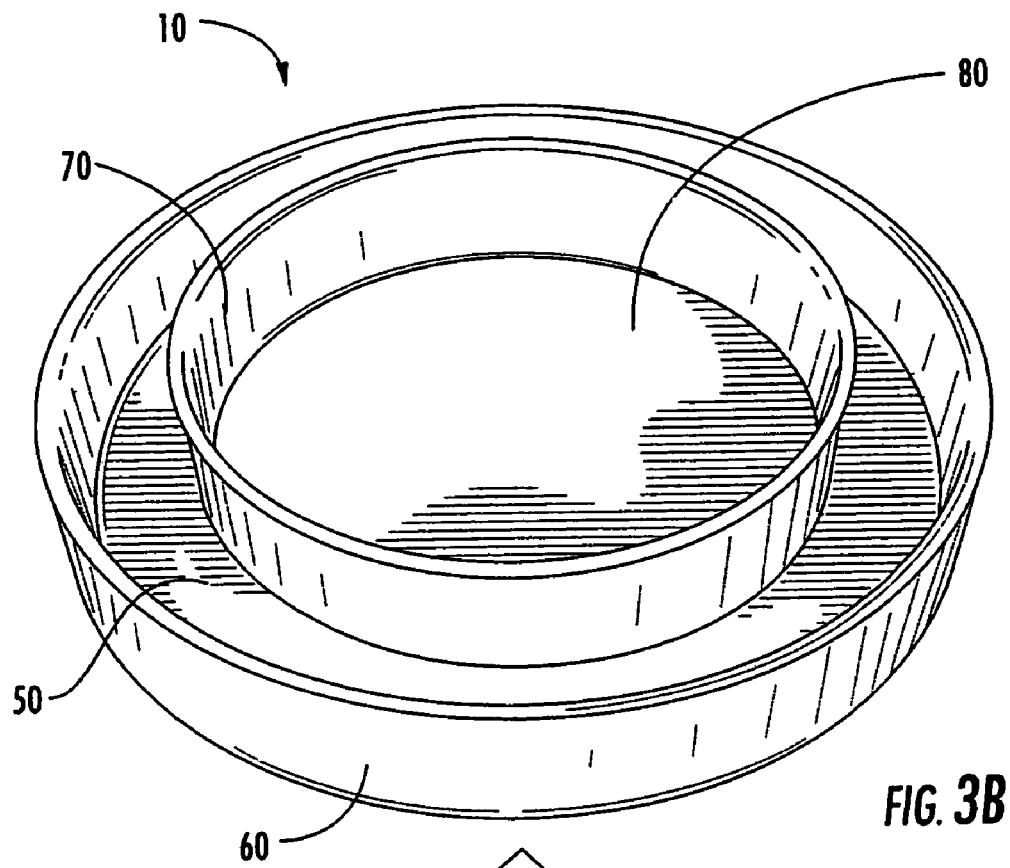
Figure 3C:
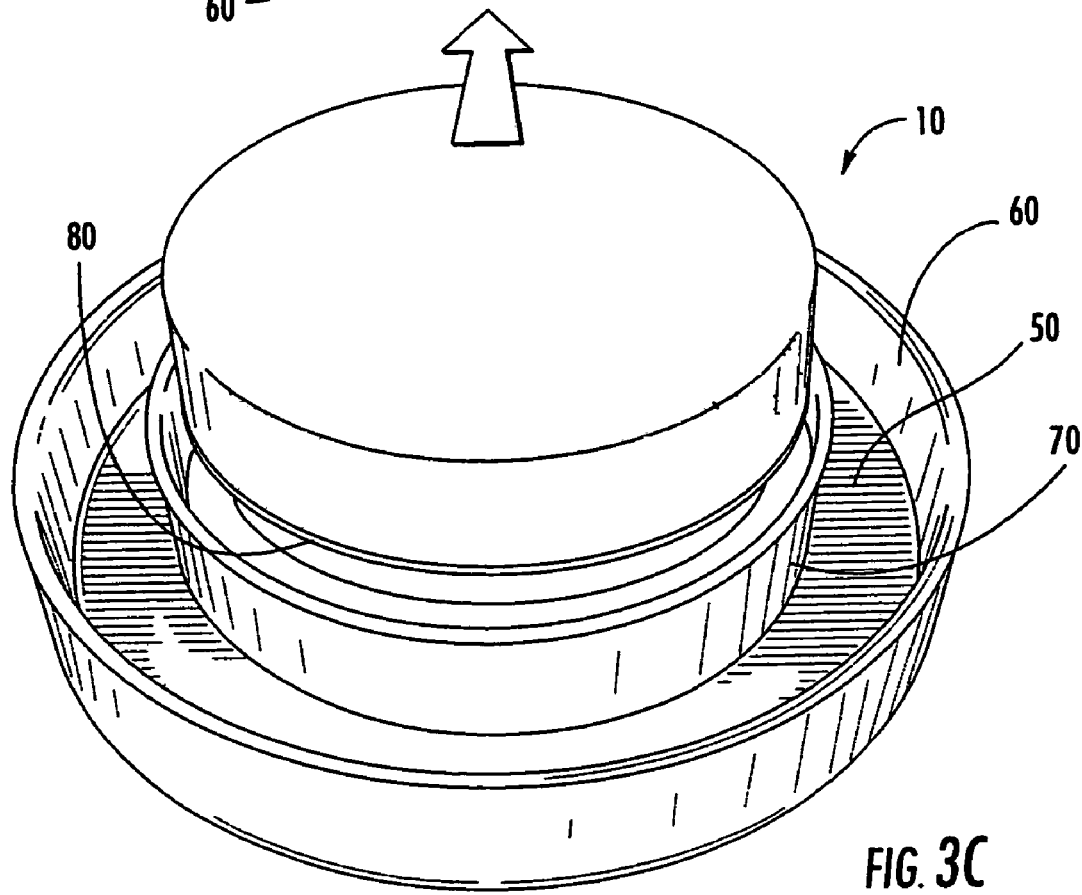

FIGS. 3A-3C show several views of another baking apparatus 10 in accordance with another embodiment of the present invention. This baking apparatus 10 differs from the above-described embodiments in that the batter for the baked good is held in the baking apparatus itself rather than in a separate springform pan. With reference to FIGS. 3A-3C, the baking apparatus 10 includes a bottom portion 50, an outer barrier 60, an inner barrier 70 and a food item receiving member 80. FIG. 3A shows a hole or opening in the bottom portion 50 of the baking apparatus 10, which is covered when the receiving member 80 is placed in the apparatus 10 and sets atop support structure 75. The outer barrier 60 and inner barrier 70 extend upwardly from the bottom portion 50. The outer barrier 60 extends the length of the bottom portion 50 and defines an outer perimeter. The inner barrier 70 is disposed within the outer perimeter. The inner barrier 70 cooperates with the outer barrier 60 and bottom portion 50 to form a watertight reservoir 90. The inner barrier 70 defines an inner portion 100 and is preferably substantially watertight to prevent leakage into the inner portion 100.

In a preferred embodiment, the food item receiving member 80 is a second bottom portion that is selectively detachable from the baking apparatus 10. The food item receiving member 80 may be a sheet of glass or metal, a pie pan, or any other suitable device or material will hold a batter of a baked good. The food item receiving member 80 is illustrated as being supported by a lip or edge members 75, but one of ordinary skill will recognize that other support structures 75 can be attached to (or associated with) the inner barrier 70 to support the receiving member 80, including, without limitation, one or more inwardly projecting flanges, a rim, a hinge, clasping device, etc.

The food item receiving member 80 rests on a support structure 75 and cooperates with an inner barrier 70 to form a batter reservoir 110. The interaction between the food item receiving member 80, inner barrier 70 and support structure 75 is preferably such that when batter for a baked good is added to the reservoir 110 little or no leakage of batter from reservoir 110 occurs during the baking process.

Because the food item receiving member 80 is detachable, when the baking process is complete, the receiving member 80 is removed from the baking apparatus 10 by pushing the baked good upward, out of the apparatus 10, without damaging the structure of the baked product. The arrow in FIG. 3C illustrates an action by which the food item receiving member 80 is pushed through and separated from a baking apparatus 10.

FIGS. 3A-3C illustrate a baking apparatus 10 in which the inner and outer barriers are circular and cooperate to form the shape of a ring. One of ordinary skill will recognize that the barriers can assume any size or shape and that the invention is not limited to the illustrated embodiment. Moreover, even though this embodiment does not require the use of a separate springform 40, a springform pan 40 can still be used with this embodiment of the apparatus 10 just as is described in connection with the foregoing embodiments. This might occur, for example, if one wanted to prepare a baked product with a size or shape that differs from that of the batter reservoir 110.

Another aspect of the present invention is a process for preparing a cheesecake or other baked good using a baking apparatus 10 like that illustrated in FIGS. 3A-3C. As before, the ingredients used to create a cheesecake batter are well known in the art and the varieties of available recipes are outside the scope of this document.

The process begins by creating a water bath in the apparatus 10 by adding water (or other suitable substance) to the watertight reservoir 90. The receiving member 80 is then affixed inside the inner portion 100 of the apparatus 10 to form the batter reservoir 110 and the batter is transferred to the batter reservoir 110. As discussed above, the water can alternatively be added to the watertight reservoir 90 after the batter is poured into the batter reservoir 110.

The baking apparatus 10 is then placed into an oven and the batter is baked until the cheesecake is done. The baking apparatus 10 is then removed from the oven and the baked good is allowed to cool. The baked good is removed from the apparatus 10 by pushing the food item receiving member 80 upward, through the apparatus 10. The cheesecake can then be removed from the food item receiving member without damaging the cake. In this way, the present invention offers all of the advantages of baking in a water bath without the problem of leakage from the water bath into the batter of the baked good. Moreover, the removable food item receiving member 80 allows a fragile cake or other baked good to be removed from the apparatus 10 without damaging the structure of the baked good in the process.

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

That which is claimed:

1. A baking apparatus comprising:
   a bottom portion;
   an outer barrier extending upwardly from said bottom portion, said outer barrier defining an outer perimeter;
   an inner barrier extending upwardly from said bottom portion, said inner barrier being disposed within said outer perimeter, and said inner barrier cooperating with said outer barrier and said bottom portion to form a substantially watertight reservoir, said inner barrier defining an interior portion;
   a food item receiving member disposed within said interior portion, said food item receiving member being adapted for supporting a food item while: (A) said food item is being cooked; and (B) said food item is substantially surrounded by said substantially watertight reservoir; and wherein an inwardly projecting lip is disposed adjacent said inner barrier to support said food item receiving member.

2. The baking apparatus of claim 1, wherein said bottom portion is a first bottom portion and said food receiving member comprises a second bottom portion that is adapted to be selectively detached from said baking apparatus.

3. The baking apparatus of claim 1, wherein said outer and inner barriers are substantially concentric.

4. The baking apparatus of claim 1, wherein said outer and inner barriers are substantially circular.

5. The baking apparatus of claim 1, wherein said outer and inner barriers are substantially circular and substantially concentric.

6. The baking apparatus of claim 1, wherein said interior portion has a diameter of about six to ten inches.

7. The baking apparatus of claim 1, wherein said inner pan and outer pan comprise different portions of a single piece of contiguous material.

* * * * *